United States Patent [19]

Fischer et al.

[11] Patent Number: 4,612,020
[45] Date of Patent: Sep. 16, 1986

[54] METHOD OF DEGASIFYING LIQUID SULFUR WHICH CONTAINS HYDROGEN SULFIDE

[75] Inventors: Herbert Fischer, Lollar; Manfred Kriebel, Frankfurt am Main, both of Fed. Rep. of Germany

[73] Assignee: Metallgesellschaft Aktiengesellschaft, Frankkfurt am Main, Fed. Rep. of Germany

[21] Appl. No.: 731,654

[22] Filed: May 7, 1985

[30] Foreign Application Priority Data

May 10, 1984 [DE] Fed. Rep. of Germany ....... 3417230

[51] Int. Cl.$^4$ .............................................. B01D 19/00
[52] U.S. Cl. .................................... 55/40; 55/41; 55/42; 55/53; 55/196; 55/94; 423/578 R
[58] Field of Search .................... 55/38, 52, 55, 73, 94, 55/223, 227, 229, 196, 198, 39–42, 53; 23/293 S; 423/578 R, 578 A

[56] References Cited

U.S. PATENT DOCUMENTS

| 1,823,188 | 9/1931 | Bushnell | 423/578 R |
| 3,364,655 | 1/1968 | Solinhac | 55/52 |
| 3,532,595 | 10/1970 | Arnesjo et al. | 55/94 |
| 3,867,287 | 2/1975 | Jakob | 55/52 X |
| 3,950,150 | 4/1976 | Smorenburg | 55/94 X |
| 4,304,570 | 12/1981 | Kleeberg et al. | 23/293 S |

FOREIGN PATENT DOCUMENTS 1567791 10/1979 Fed. Rep. of Germany.
1433822 4/1976 United Kingdom.

Primary Examiner—Charles Hart
Attorney, Agent, or Firm—Karl F. Ross; Herbert Dubno

[57] ABSTRACT

The liquid sulfur which contains $H_2S$ is sprayed in a steel vessel and the liberated gases which are rich in $H_2S$ are withdrawn. A degasification accelerator is added to the liquid sulfur. The steel vessel contains at least two chambers, which communicate with each other and are connected in series. Sulfur at temperatures in the range from 140° to 160° C. is supplied to the first chamber. Sulfur is withdrawn from the second chamber and is cooled to temperatures of 120° to 135° C. outside the vessel. The liquid sulfur which has been cooled is sprayed in the gas space of the first chamber. The sulfur is caused to remain in the steel vessel for a dwelling time of 12 to 32 hours. The gas spaces of the chambers are scavenged with an oxygen-free inert gas. The sulfur is withdrawn from the vessel and sprayed in the gas space of one of the chambers about 30 to 50 times until the dwelling time of the sulfur in the vessel has expired.

7 Claims, 1 Drawing Figure

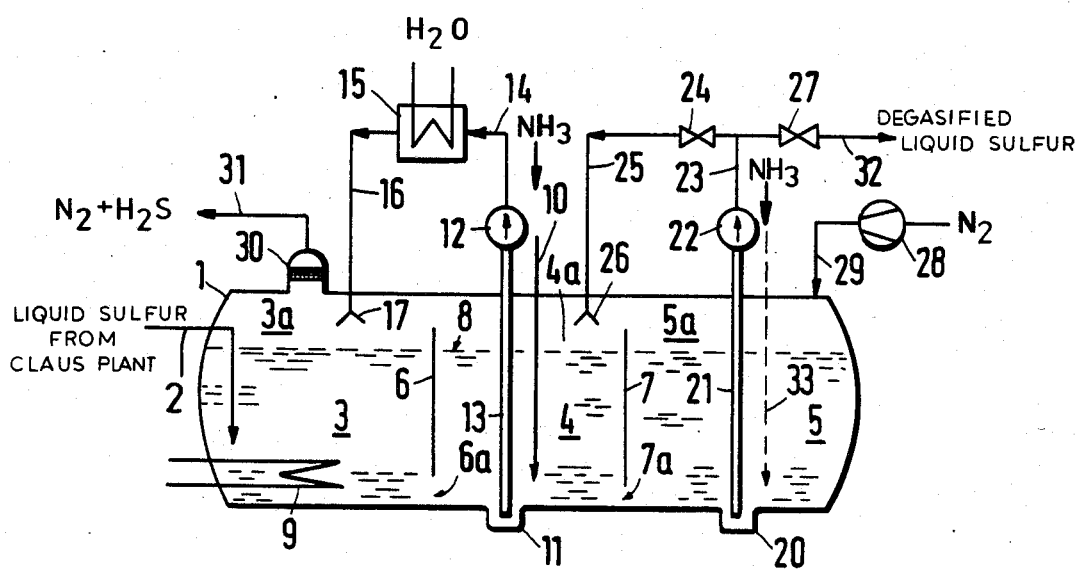

METHOD OF DEGASIFYING LIQUID SULFUR WHICH CONTAINS HYDROGEN SULFIDE

FIELD OF THE INVENTION

Our present invention relates to a method of degasifying liquid sulfur which contains hydrogen sulfide involving the addition of a degasification accelerator to the sulfur, and the spraying of the liquid sulfur, the liberated gas rich in $H_2S$ being withdrawn.

BACKGROUND OF THE INVENTION

The degasification of liquid sulfur which contain hydrogen sulfide has been described in German Patent No. 15 67 791 and British Patent No. 1,433,822. In these known techniques liquid sulfur which has been produced in sulfur-producing plants by the Claus process is treated to remove $H_2S$. That liquid sulfur contains hydrogen sulfide ($H_2S$) and polysulfides ($H_2S_x$).

The transportation of such sulfur in a liquid state involves the risk that an atmosphere which contains $H_2S$ may be formed in the gas space of the transport vehicle and that atmosphere may form an explosive mixture. Particularly, in steel containers an $H_2S$ atmosphere may result in an explosion due at least in part to the formation of pyrophoric iron. For this reason the liquid sulfur which comes from the Claus process plant at an elevated temperature must be degasified as far as possible.

In the process of German Pat. No. 15 67 791 the liquid sulfur is sprayed into a chamber at a temperature of 125° to 145° C. Ammonia as a degasification accelerator is added to the sulfur before it is sprayed. The degasification accelerator serves mainly to convert the polysulfide to liquid hydrogen sulfide.

The British Patent No. 1,433,822 teaches that it is possible to use also air or diethanolamine as a degasification accelerator. The process in accordance with the British patent uses a vessel having two chambers and an overflow over which the treated sulfur flows from the first chamber into the second.

OBJECTS OF THE INVENTION

It is the principal object of our present invention to degasify the liquid sulfur reliably at low cost in a steel vessel while precluding the explosion risk which could be created by a presence of pyrophoric iron.

Another object is to effect the method such that an undesired temperature rise of the liquid sulfur to be treated is avoided.

SUMMARY OF THE INVENTION

These objects are achieved in accordance with the invention in that the degasification is effected in a steel vessel containing at least two chambers which contain liquid sulfur and each of which has a gas space above the liquid sulfur. The sulfur is conducted through the chambers, which are connected in series. Sulfur at a temperature in the range of 140° to 160° C. is supplied to the first chamber via a sulfur inlet. Sulfur is withdrawn from the second chamber and is cooled outside the vessel to a temperature of 120° to 135° C. The cooled liquid sulfur is sprayed into the gas space of the first chamber, the gas spaces of the chambers being scavenged with an oxygen-free inert gas, which is withdrawn from the vessel through the gas space of the first chamber, and the sulfur is caused to remain in the vessel for a residence time of 12 to 32 hours.

The residual content of $H_2S$ and $H_2S_x$ can be reduced to or below 10 ppm in this manner. These and all following ppm values are stated as ppm by weight, unless otherwise indicated.

In view of that small residual content of $H_2S$ and $H_2S_x$ there is no longer any risk of ignition or explosion in an atmosphere above liquid or molten sulfur transport and there will be no noxious smell due to $H_2S$ rising from liquid sulfur in storage.

The sulfur is preferably caused to remain in the vessel for a residence time of about 18 to 26 hours.

The inert gas used consists preferably of a gas which comprises 40 to 100 vol. % nitrogen. Such an inert gas is constituted, e.g. by the exhaust gas which becomes available in a Claus process plant. That exhaust gas contains $CO_2$ and $H_2O$ in generally that nitrogen or $CO_2$ may be used as an inert gas. It is already known to use ammonia, air or amines as degasification accelerator and these may be used in accordance with the invention.

The degasification accelerator is added to the liquid sulfur in an amount of about 5 to 50 ppm, preferably 5 to 10 ppm, if ammonia is used, 10 to 200 ppm, preferably 20 to 50 ppm, if air is used, and about 10 to 60 ppm if amines are used.

An important aspect of the process in accordance with the invention is the use of a cooler for cooling the liquid sulfur which has been sucked from the second chamber and which is to be sprayed into the first chamber. That cooler is intentionally located outside the degasification vessel and preferably water is used, e.g. as a coolant.

The cooler ensures that the sulfur sprayed into the first chamber is at a constant temperature in the range from 120° to 135° C., preferably from 122° to 125° C. Those temperatures are closely above the melting temperature of the sulfur so that the latter has a very low viscosity. As a result the sulfur can be sprayed to a small particle size so that the degasification will be improved. The cooling maintains the sulfur in the vessel at temperatures in the range from 120° to 140° C. and will reliably prevent a rise to higher temperatures.

The sulfur to be degasified usually comes from a Claus process plant and is at a temperature in the range of about 140° to 160° C. as it enters the degasification vessel. In the degasification vessel the sulfur will not be spontaneously cooled but is more likely to undergo a temperature rise, but the viscosity of the sulfur increases with its temperature and at temperatures above 160° C. the sulfur is so viscous that it can no longer be pumped. Such a temperature rise is prevented by the cooler disposed outside the degasification vessel; that cooler may also be used to generate steam which can be used elsewhere in the plant.

We prefer to withdraw the sulfur from the vessel and to spray the sulfur into the vessel about 30 to 50 times until the dwelling time of the sulfur in the vessel has expired. This can easily be effected in a particularly preferred embodiment of the invention, in which the degasification is effected in a vessel which contains three series-connected chambers. Sulfur is withdrawn also from the third chamber and that sulfur is sprayed into the gas space of the second chamber. A particularly intense degasification will be effected if a degasification promoter is added also to the liquid sulfur in the third chamber.

The apparatus for carrying out the process in accordance with the invention comprises a steel vessel having two or three chambers. Each chamber comprises a gas space disposed over the liquid. Adjacent gas spaces communicate with each other.

BRIEF DESCRIPTION OF THE DRAWING

The above and other objects, features and advantages of the present invention will become more readily apparent from the following description, reference being made to the accompanying drawing in which the sole FIGURE is a diagrammatic cross section through a degasification apparatus according to the invention.

SPECIFIC DESCRIPTION

Liquid sulfur from a Claus process plant (line 2) and containing $H_2S$ and $H_2S_x$ is supplied to a gasification vessel 1 made of steel. The vessel contains three chambers 3, 4 and 5, which are defined by partitions 6 and 7. The liquid level 8 in the vessel 1 is below the top edges of the partitions 6 and 7. Liquid can flow between chambers through an opening 6a or 7a in the lower portion of each partition. The sulfur is maintained in a liquid state by a plurality of heating registers 9, only one of which is shown in the drawing.

A degasification accelerator is added at a metered rate through line 10 to the sulfur in the intermediate chamber 4. From a pump well 11 of the same chamber, liquid sulfur is sucked by means of a pump 12 through the riser 13 and is supplied in line 14 to a cooler 15. Water is suitably used as a coolant in the cooler 15, in which steam under a pressure of about 2 bars is produced. The cooler ensures that the liquid sulfur conducted to the spray head 17 in line 16 will be at temperatures in the range from 120° to 135° C., preferably from 122° to 125° C. The sulfur is sprayed at a temperature which is only slightly greater than its melting temperature so that the sulfur being sprayed has a relatively low viscosity.

The sprayhead 17 is disposed in the gas space 3a provided in the chamber 3 above the liquid level therein. Hydrogen sulfide which has been liberated collects in the gas space 3a and the sprayed sulfur mixes with the liquid bath.

Sulfur flows from the chamber 3 through the opening 6a in the partition 6 to the chamber 4 and from the latter to the chamber 5 through the opening 7a. The partitions 6 and 7 prevent a backmixing of sulfur from chamber 5 with the sulfur in chamber 4 and of sulfur in chamber 4 with sulfur in chamber 3. This ensures that the finally withdrawn sulfur will have the highest possible purity.

The chamber 5 is provided with a pump 22 whose riser 21 draws up sulfur and the latter is forced through the line 23, the opened valve 24 and the line 25 to the sprayhead 26. As a result, sulfur is also circulated between the chamber 4 and 5.

The valve 27 is closed during this circulation. The sprayhead 26 is disposed in the gas space 4a of chamber 4. That gas space communicates with the gas space 3a.

To remove accumulated gases from the gas spaces they are scavenged by inert gas supplied by a blower 28 and a line 29 into the gas space 5a of chamber 5 so that the gases contained in the gas spaces 5a, 4a and 3a are forced through the mist collector 30 into the gas exhaust line 31.

The line 31 is suitably connected to an afterburner such as is usually associated with a Claus process plant. The inert gas supplied in line 29 may be an exhaust gas from the Claus process plant.

In the embodiment shown in the drawing the liquid sulfur which has been degasified is withdrawn in batches by means of the above-mentioned pump 22 through the outlet 32 when the valve 27 is open and the valve 24 is closed at the same time. If the liquid sulfur is to be degasified to a particularly high degree it may be desirable to add additional degasification accelerator at a metered rate through the dotted-line conduit 33 during the time in which sulfur is sprayed by the sprayhead 26 when the valve 24 is open and the valve 27 is closed. But that addition will not be required in general.

SPECIFIC EXAMPLE

A degasifier such as is shown in the drawing is associated with a Claus process plant for producing liquid sulfur at a rate of 125 metric tons per day. The cylindrical degasification vessel 1 is made of steel and has a length of 15 meters and a diameter of 3.2 meters. The depth of the bath of liquid sulfur in the vessel is not in excess of 2.5 meters. Each of the pumps 12 and 22 operates at a capacity of 100 m$^3$/h so that the contents of the vessel 1 will be recirculated 34 times and the sulfur is maintained in the vessel 1 for a dwelling time of 24 hours. By means of the cooler 15 the sulfur in the vessel 1 is maintained at a temperature of 130° C. $NH_3$ as a degasification accelerator is added through line 10 at a rate of 30 g/h. The line 33 is here not utilized. The gas spaces 5a, 4a and 3a are scavenged with nitrogen supplied from line 29 at a rate of 100 m$^3$/h STP. The liquid sulfur is degasified to at most traces of $H_2S$ in this manner.

We claim:

1. A method of degasifying liquid sulfur which contains hydrogen sulfide, which comprises the steps of:
    (a) passing said liquid sulfur in series through at least two chambers of a steel vessel, each of which is formed with a gas space above liquid sulfur therein, which are connected in series, the liquid sulfur being supplied to a first of said chambers at a temperature of 140° to 160° C.;
    (b) withdrawing liquid sulfur from a second of said chambers and cooling the withdrawn liquid sulfur outside the vessel to a teperature of 120° C. to 135° C.;
    (c) spraying the cooled liquid sulfur into the gas space of the first chamber;
    (d) scavenging the gas spaces of the chambers with an oxygen-free inert gas, which is withdrawn from the vessel through the first chamber; and
    (e) retaining the sulfur in the vessel for a residence time of 12 to 32 hours.

2. The method defined in claim 1 wherein the sulfur is retained in the vessel for a residence time of 18 to 26 hours.

3. The method defined in claim 1 wherein the inert gas used consists of a gas which comprises 40 to 100 vol. % nitrogen.

4. The method defined in claim 1, further comprising adding a degasification accelerator selected from the group which consists of ammonia, air and amines to the liquid sulfur in said vessel.

5. The method defined in claim 4 wherein the degasification is effected in a vessel containing three series-connected chambers, and sulfur is withdrawn from the third of said chambers and is sprayed in the gas space of the second chamber.

6. The method defined in claim 5 wherein said degasification accelerator is added to the liquid sulfur in the third chamber.

7. The method defined in claim 4 wherein the sulfur is withdrawn and sprayed about 30 to 50 times until its residence time in the vessel has expired.

* * * * *